Patented Feb. 7, 1939

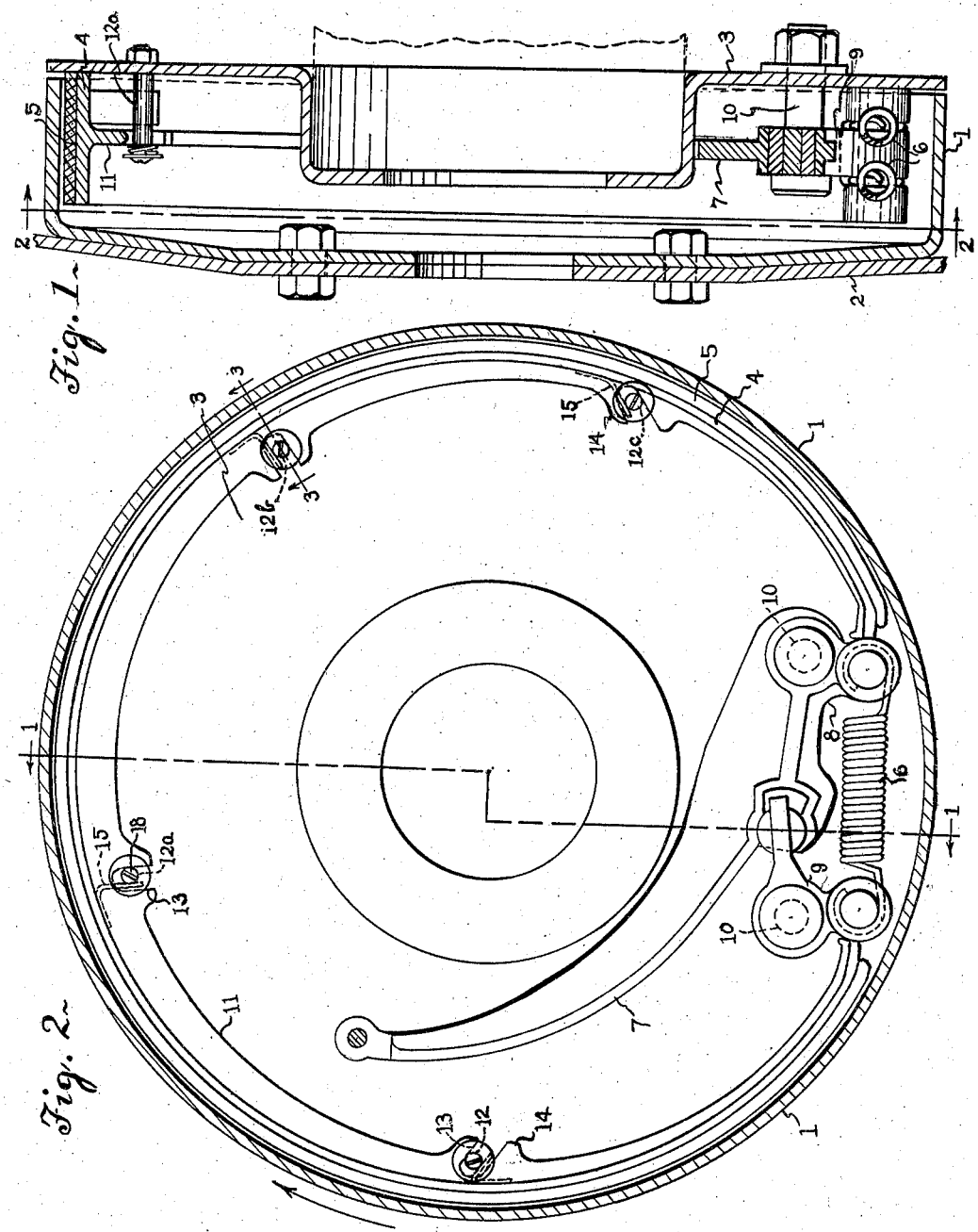

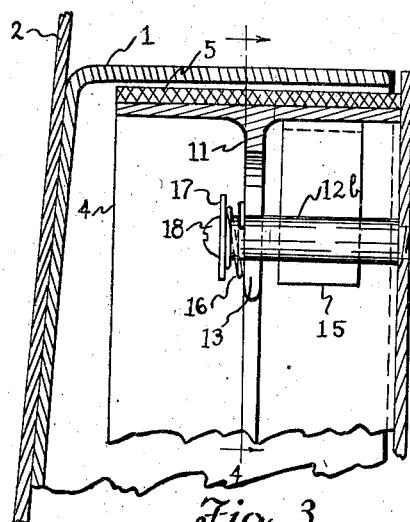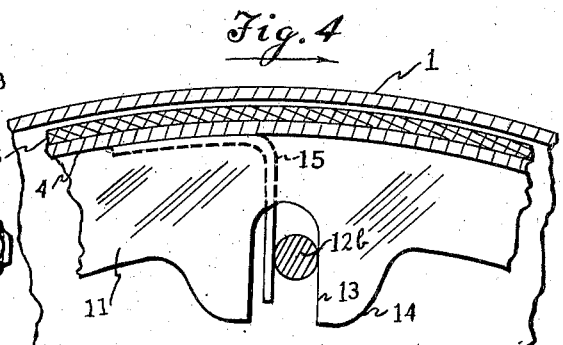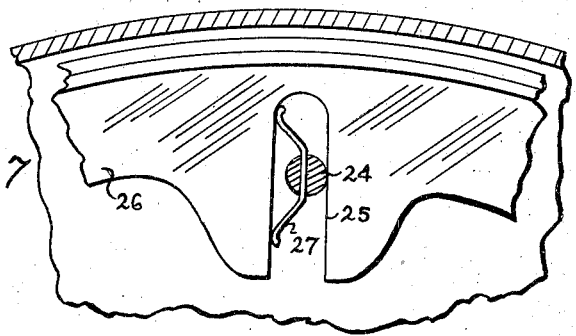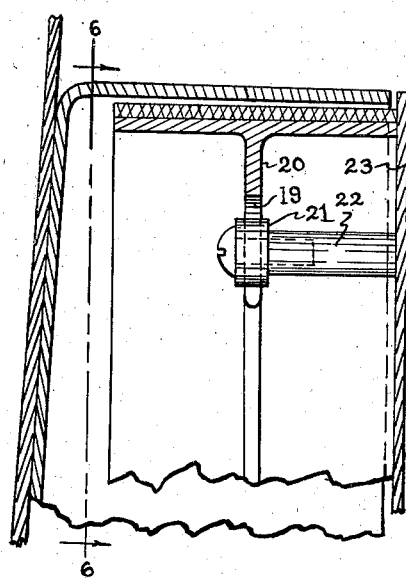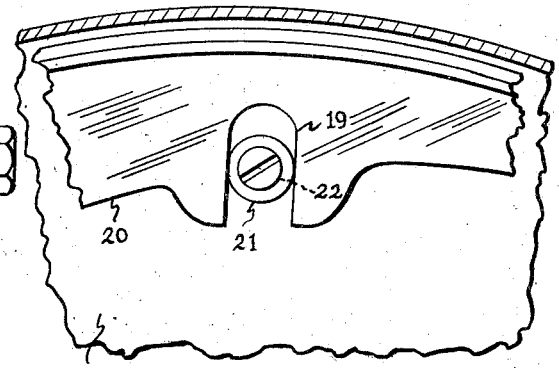

2,146,287

UNITED STATES PATENT OFFICE 2,146,287

BAND BRAKE

Armin A. Darmstaetter, Detroit, Mich.

Application July 6, 1937, Serial No. 152,015

7 Claims. (Cl. 188—78)

This invention relates to brakes and particularly brakes employing an expansible and contractible band to retard or arrest a drum.

An object of the invention is to engage a brake band by a plurality of anchorage devices at circumferentially spaced points thereof and to guide it differentially by said devices as it expands or contracts, according to the predetermined directional travel of the band at such points.

Another object is to form the band with slots extending inwardly at different divergencies to the drum axis, to accommodate pins forming said anchorage devices.

A further object is to associate with each anchorage device a resiliently flexible member, transmitting band torque to such device, and yieldable under predetermined torque to let the anchorage devices take direct effect.

These and various other objects the invention attains by the construction hereinafter described, and illustrated in the accompany drawings, wherein:

Fig. 1 is a diametrical sectional view of a brake embodying one form of the invention.

Fig. 2 is a sectional view taken in a rotational plane of the drum, as indicated by the line 2—2 of Fig. 1.

Fig. 3 is a fragmentary radial section taken upon the line 3—3 of Fig. 2.

Fig. 4 is a fragmentary section taken on the line 4—4 of Fig. 3.

Fig. 5 is a fragmentary radial view showing a modified provision for anchoring and guiding the brake band.

Fig. 6 is a sectional view thereof taken on the line 6—6 of Fig. 5.

Fig. 7 is a view similar to Fig. 6, showing a further modification.

In these views, the reference character 1 designates a brake drum secured in the usual manner to a wheel 2 and having the usual backing plate 3 fixedly mounted in proximity to its open side. A brake band 4, equipped with the usual lining 5 is interiorly engageable with the drum, being normally contracted by springs 6. The band may be expanded to engage the drum by any suitable mechanism, as for example, a lever 7 effective on the ends of the band through a pair of bell cranks 8 and 9 pivoted by pins 10 on the backing plate. In the illustrated mechanism, the bell crank 8 affords the lever a leverage substantially double that afforded by the bell crank 9. This provision of unequal leverages is desirable since, in applying the brake, the end of the band engaged by the bell crank 8 is shifted counter to normal drum rotation (indicated by an arrow in Fig. 2) and hence must take a greater load, due to drum torque reacting on the band. The band is reinforced by an inwardly projecting flange 11 coextensive with the band, and at suitable circumferentially spaced points said flange is engaged by anchorage and guide devices constituting the present improvement. These devices comprise pins 12, 12a, 12b, and 12c rigidly projecting from the backing plate 3, the flange 11 being slotted as indicated at 13 to accommodate said pins. As shown, the slots 13 extend from the inner edge of the flange 11, the latter being formed with inwardly projecting lugs 14 to afford the slots a requisite length without unduly weakening the flange.

Since the ends of the band are forced apart to effect its expansion, it follows that a true radial movement occurs only at the point where the opposing circumferential forces are neutralized. This point, in the construction shown is considerably nearer to the bell crank 8 than to the bell crank 9, owing to the greater motion produced by the bell crank 8. It is preferred to engage one of the anchorage and guide pins, as 12b, with the band at its point of true radial motion, the corresponding slot 13 being consequently radial. The remaining slots 13 predeterminedly diverge from the radii determined by the corresponding pins, according to the predetermined motion of the band at its slotted points. (See Fig. 2.)

It is preferred to afford the band a slight circumferential play relative to the anchorage and guide pins 12, 12a, 12b, and 12c, as an allowance for inaccuracies of workmanship and to afford the band a slight bodily circumferential movement. Thus the slots are proportioned in width to slightly exceed the thickness or diameters of said pins, and sheet metal springs 15 are rigidly secured to the band, as by welding and are bent to extend in parallelism with the slots 13, having a free guiding and torque-transmitting engagement with the corresponding pins 12, 12a, 12b, and 12c. Said springs are sufficiently stiff to resist stresses incident to expansion and contraction of the band, but will flex under a predetermined application of torque, the flange 11 then being afforded direct engagement with said pins.

The pins 12, etc. are preferably further utilized to mount coiled springs 16, subjecting the band to a slight pressure toward the backing plate, said springs, as best appears in Fig. 3, being compressed between washers 17 and the flange 11. The pins terminally project beyond said flange to carry said washers, which may be positioned on the pins by screws 18.

Figs. 4 and 5 show a guiding and anchorage device, such as has been described, except that a slot 19 in a flange 20 of the brake band snugly accommodates a roller 21, journaled terminally on a pin 22 rigidly projecting from the backing plate 23.

The further modification disclosed in Fig. 7 extends a diametrically slotted pin 24 into a slot 25 of the flange 26 on the brake band and a bow spring 27 fixedly mounted in the pin slot projects inwardly and outwardly from the pin to bear on that edge of the slot from which torque stresses will normally be transmitted.

By engaging the band, as described, with anchorage and guiding devices at several circumferentially spaced points, a considerable portion of the torque reaction is carried to the backing plate, independently of the mechanism for applying the brake, and consequently any desired application of the brake may be maintained with much less exertion of force by the operator than would otherwise be the case.

It is to be understood that circumferential travel of the band, affording it anchorage engagement with the pins 12, 12a, 12b, and 12c, when a torque is imposed on the band by the drum, is very slight, the illustrated provision for such travel being considerably exaggerated. It is unnecessary to make special provision for such travel, since freedom afforded by the pivotal connections between the bell cranks and band extremities and such slight stretching of the band as occurs under torque, suffices to let said pins take effect.

The invention is presented as including all such modifications and changes as come within the scope of the following claims.

What I claim is:

1. A brake comprising a drum, a band interiorly frictionally engageable with the drum, yieldable means for normally contracting the band, means for expanding the band into frictional engagement with the drum, and a plurality of anchorage elements effective on the band at circumferentially spaced points thereof, adapted to differentially guide the band in its expansion and contraction, and coacting to receive its torque load.

2. A brake as set forth in claim 1, said band having slots receiving said anchorage elements, said slots being elongated toward the central portion of the drum, but differentially with respect to the drum axis.

3. A brake as set forth in claim 1, said band having a circumferentially elongated flange projecting toward the axis of the drum, and such flange being formed with guide slots accommodating said anchorage elements, elongated toward the central portion of the drum at different divergencies to the drum axis.

4. In a brake as set forth in claim 1, a spring associated with each anchorage element, transmitting the band torque to such element.

5. A brake as set forth in claim 1, said band having slots receiving the anchorage elements, elongated toward the central portion of the drum at different divergencies to the drum axis, and a spring carried by each of said elements, engaging an edge of the corresponding slot to transmit torque to said element from the band.

6. A brake comprising a rotative drum, a band interiorly engageable with the drum, means for normally contracting the band to afford the drum free rotation, means for expanding the band into frictional engagement with the drum, a backing plate fixed as regards drum rotation, a plurality of anchorage elements carried by the backing plate and effective on the band at circumferentially spaced points thereof to differentially guide the band in its expansion and contraction, and springs mounted upon the anchorage elements urging the band into engagement with the backing plate.

7. A brake comprising a rotative drum, a band interiorly engageable with the drum, means for normally contracting the band to afford the drum a free rotation, means for expanding the band into frictional engagement with the drum, a plurality of rigid anchorage elements effective on the band at circumferentially spaced points thereof, a flexible anchorage element associated with each rigid anchorage element, yieldable under predetermined band torque to permit the rigid elements to take direct effect on the band.

ARMIN A. DARMSTAETTER.